United States Patent

Dorner et al.

[11] 3,899,393
[45] Aug. 12, 1975

[54] NUCLEAR REACTOR ASSEMBLY

[75] Inventors: Heinrich Dorner; Manfred Scholz; Axel Jungmann, all of Erlangen, Germany

[73] Assignee: Siemens Aktiengesellschaft, Munich, Germany

[22] Filed: May 22, 1973

[21] Appl. No.: 362,833

[30] Foreign Application Priority Data
May 31, 1972 Germany............................ 2226574

[52] U.S. Cl................ 176/87; 176/19 LD; 250/517
[51] Int. Cl...................... G21c 17/00; G21c 11/00
[58] Field of Search .. 176/87, DIG. 2, 19 R, 19 LD, 176/37, 38; 250/515, 517, 518

[56] References Cited
UNITED STATES PATENTS
3,159,550 12/1964 Laming................................. 176/87
3,182,000 5/1965 Benzler................................. 176/87

*Primary Examiner*—Benjamin A. Borchelt
*Assistant Examiner*—C. T. Jordan
*Attorney, Agent, or Firm*—Kenyon & Kenyon Reilly Carr & Chapin

[57] ABSTRACT

A nuclear reactor assembly includes a reactor pressure tank having a substantially cylindrical side wall surrounded by the wall of a cylindrical cavity formed by a biological shield. A rotative cylindrical wall is interposed between the aforesaid walls and has means for rotating it from outside of the shield, and a probe is carried by the rotative wall for monitoring the pressure tank's wall. The probe is vertically movable relative to the rotative cylindrical wall, so that by the probe's vertical movement and rotation of the rotative cylinder, the reactor's wall can be very extensively monitored. If the reactor pressure tank's wall fails, it is contained by the rotative wall which is backed-up by the shield cavity wall.

7 Claims, 1 Drawing Figure

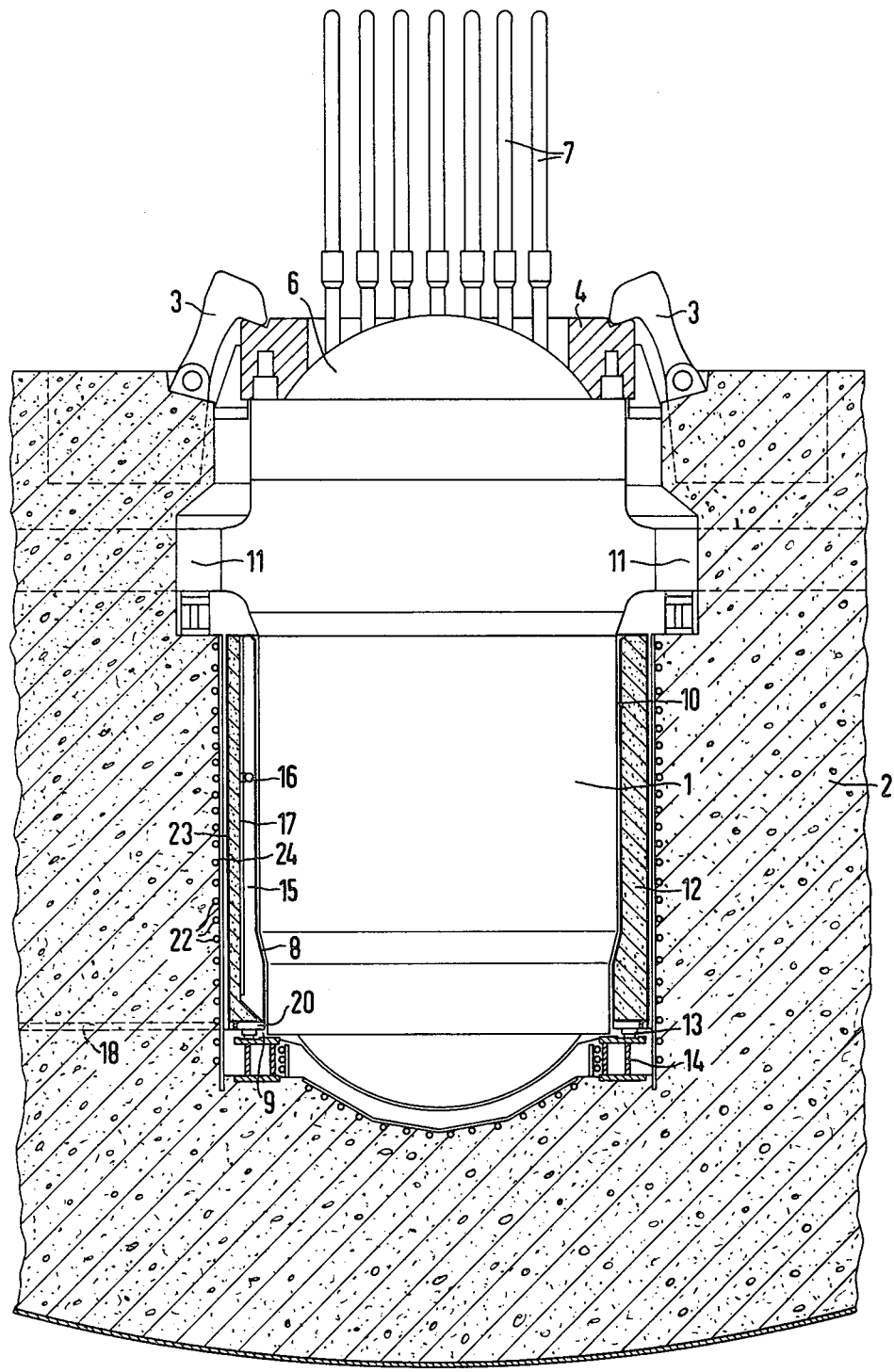

NUCLEAR REACTOR ASSEMBLY

BACKGROUND OF THE INVENTION

A nuclear reactor assembly, particularly of the pressurized-water coolant type, includes a reactor pressure tank having a side wall which is substantially cylindrical and surrounded by the wall of a cylindrical cavity formed by a concrete biological shield. Ordinarily the radial space between the tank's wall and the cavity's wall is made relatively small so that if the tank's wall should fail during operation of the reactor, it is contained by the cavity wall, while released coolant has only a small area through which to escape.

To monitor the pressure tank's wall, is is desirable to use probes such as are adapted for application of the ultrasonic detection technique, for example. For such a probe to reach the tank's side wall, pipes or the like must extend through the biological shield, the number of these pipes being obviously limited, and this correspondingly limiting the area of the tank's wall that can be monitored.

If the space between the tank and shield cavity walls is radially enlarged to permit more direct and, therefore, more extensive monitoring of the tank's wall, the pressure tank's wall is not adequately contained and the larger space permits the coolant to escape through a large cross sectional area, in the event of a tank wall failure.

SUMMARY OF THE INVENTION

One object of the present invention is to provide a nuclear reactor assembly permitting extensive monitoring of the pressure tank's wall while providing effective containment for the latter both for its support and to avoid rapid coolant escape if the tank's wall fails.

According to the present invention, this object is attained by providing a large radial space between the tank and cavity walls, but filling this space to a large degree by an interposed cylindrical wall which is rotative relative to the two fixed walls. This rotative wall mounts a probe having direct access to the tank wall, and my making this probe movable in a vertical direction relative to the rotative wall, a combination of rotative motion by this interposed wall and vertical motion of the probe this wall carries, makes it possible to monitor substantially the entire area of the pressure tank's wall.

The radial space between this rotative wall and the two fixed walls may be made just sufficient to provide clearance permitting the rotative wall to be rotated. Therefore, all of the wall's mutually opposed surfaces are spaced closely together making the strength of the massive biological shield an effective containment factor. The rotative wall itself may be made relatively thick with a vertical groove formed in its side facing the pressure tank and in which a guideway is mounted so the probe can run up and down via this guideway. The rotative wall may be made of concrete with its outer side surface circumferentially continuous since the vertical groove need not extend completely through the cylinder's wall. To make the wall easily rotative, its lower end is supported on a circular track and rollers are interposed between the lower end of the rotative wall and this track.

Rotation of the rotative wall from outside of the biological shield may be effected by a ring gear fixed to the bottom end of the rotative wall and in mesh with a pinion rotated by a horizontal shaft which extends through the biological wall to the outside of the latter. The probe carried by the guideway may be carried by a small motorized carriage of the electrically powered type and also controlled from the outside of the biological shield.

Because the concrete rotative cylindrical wall has its inner side closely spaced to the pressure tank's wall and its outer surface closely spaced with respect to the biological shield's cavity inner wall, the containment action required in the event the pressure tank's wall fails, is as effective as if the biological shield cavity wall itself was closely spaced with respect to the pressure tank's wall.

In addition, the outside of the rotative cylinder may be reinforced by an encirclement of wide strip steel or the like. The inner portion of the biological shield cavity may be provided with cooling means to remove heat from it as well as the rotative wall.

BRIEF DESCRIPTION OF THE DRAWING

A preferred embodiment is illustrated wherein the reactor pressure tank is shown in elevation with the concrete biological shield and the concrete rotative wall in vertical section.

DESCRIPTION OF THE PREFERRED EMBODIMENT

Referring to the above drawing, the reactor pressure tank 1, of a pressurized-water reactor, is located in the cavity or pit of the concrete biological shield 2. Both the tank's wall and the wall of the cavity of the biological shield are substantially cylindrical. In the upward direction the pressure tank 1 has protection by an assembly comprising releasable steel hooks 3 which engage a steel intercept ring 4 which overlaps the periphery of the pressure tank's lid 6 from which the control rod drives 7 extend upwardly. The lower ends of the hooks 3 are connected with anchorages embedded in the concrete of the biological shield 2.

The wall surfaces have been described as being cylindrical, but it is to be understood that the pressure tank's lower end may be reduced in size so that in its area 8 there is a tapered portion. With this exception the major portion 10 of the pressure tank's side wall is cylindrical. The gap 9 between the pressure tank and the cavity of the biological shield 2 is made relatively large.

The gap or space 9 is substantially or almost completely filled radially by the rotative cylindrical concrete wall 12, its outside being cylindrical and its inside being substantially cylindrical excepting for the tapered portion required for the rotative wall's inside to fit the tank's wall substantially exactly.

This concrete wall 12 is formulated mostly in favor of its thermal insulating properties because structurally its outside is supported by the biological shield should the rotative wall be radially stressed outwardly.

At its lower end the wall 12 is provided with rollers 13 riding in a circular track 14, thus facilitating rotation of the wall. Along one of its inside portions the rotative wall 12 has the vertically extending groove 15 in which the vertically traveling probe 16 is mounted to ride on a vertically extending guideway 17. Although not shown in detail, the probe 16 may be carried by a carriage which is electrically motorized and externally controllable from the outside of the biological shield so that the probe 16 may be moved to any vertical location desired. It is to be noted that the groove 15 extends only about halfway through the wall thickness of the rotative concrete wall 12 so that circumferential integrity of the latter is maintained and radially the wall can carry conpression effectively. A shaft 18 extends from the outside of the biological shield 2 through the latter and to the lower end of the rotative wall 12 where through a right angular pinion and ring gear drive 20 the wall 12 may be rotated, the ring gear of this drive being fixed to the bottom of the wall 12.

The cavity wall is shown as being cooled by surrounding water pipes 22 which are located near to the cavity wall's surface and the rotative wall 12 has its outside clad with sheet steel 23 to reinforce the rotative wall while thermally cooperating with the cooling arrangement to facilitate the removal of heat from the rotative wall 12. For this thermal purpose, the inner wall of the biological shield cavity may be clad with sheet steel 24, cooled almost directly by the cooling pipes 22 and to which heat is radiated through the very small separating gap, by the cladding 23.

What is claimed is:

1. A nuclear reactor assembly including a reactor pressure tank having a substantially cylindrical side wall and a biological shield having a cylindrical cavity forming a wall surrounding said side wall; wherein the improvement comprises a rotative substantially cylindrical wall interposed between the aforesaid walls and having means for rotating it from outside of said shield, and a probe carried by said rotative wall for monitoring said pressure tank's wall.

2. The assembly of claim 1 in which said probe is vertically movable so that by its vertical movement and rotation of said rotative cylindrical wall said reactor's wall can be extensively monitored.

3. The assembly of claim 2 in which said rotative wall is made of concrete and is formed with a vertical channel having a closed bottom but open to said reactor's wall and in which is positioned a guideway for said probe.

4. The assembly of claim 3 in which the lower end of said rotative wall is supported on a circular track and rollers are interposed between said end and track.

5. The assembly of claim 4 in which said rotative wall is externally reinforced by metal cladding.

6. The assembly of claim 5 in which the exterior of said rotative wall is close to the wall of said shield's cavity wall so as to be supported thereby against outward displacement in the event of outward radial displacement.

7. The assembly of claim 6 in which said rotative wall is rotated by a ring gear and pinion drive having the ring gear fixed to the rotative wall and having a drive shaft extending through said shield.

* * * * *